United States Patent [19]
Hensley

[11] Patent Number: 5,635,080
[45] Date of Patent: Jun. 3, 1997

[54] FILTER SYSTEM WITH EXTERNAL SCRUBBER

[76] Inventor: Clifford J. Hensley, P.O. Box 3147, Odessa, Tex. 79760

[21] Appl. No.: 559,991

[22] Filed: Nov. 17, 1995

[51] Int. Cl.$^6$ .................................................. B01D 24/46
[52] U.S. Cl. ......................... 210/792; 210/269; 210/280; 210/807
[58] Field of Search .................................. 210/269, 270, 210/275, 279, 280, 792–796, 503, 807

[56] References Cited

U.S. PATENT DOCUMENTS

| | | | |
|---|---|---|---|
| 395,070 | 12/1888 | Moore | 210/269 |
| 791,431 | 5/1905 | Roberts | 210/269 |
| 4,071,452 | 1/1978 | Friese | 210/269 |
| 4,496,464 | 1/1985 | Hensley | 210/269 |
| 4,687,582 | 8/1987 | Dixon | 210/269 |
| 4,787,987 | 11/1988 | Hensley | 210/269 |
| 4,826,609 | 5/1989 | Hensley | 210/792 |
| 4,966,698 | 10/1990 | Hensley | 210/269 |
| 5,171,443 | 12/1992 | Bratten | 210/269 |
| 5,407,574 | 4/1995 | Hensley | 210/269 |

*Primary Examiner*—Robert J. Popovics

[57] ABSTRACT

Method and apparatus by which contaminants are removed from a liquid flowing through a filter vessel having an inlet for providing a contaminated liquid flow into one end thereof and an outlet through which filtered liquid can exit the vessel. A filter screen supports a relatively large quantity of particulate filter media within the filter vessel on the filter screen for normal filter operation and captures contaminants by flowing contaminated liquid through the inlet while filtered liquid exits through the filter screen and outlet, leaving the contaminants on the filter media. The system automatically occasionally cleans the media in a unique cleaning cycle, that includes one or a plurality of closed loop flow paths that fluidizes the media within one filter vessel and cleans the media externally of the filter vessel by flowing the fluidized filter media along the closed loop flow path. The closed loops each include a fluidizing nozzle in the filter vessel and a scrubber vessel externally thereof to fluidize the media while concurrently flowing the fluidized media along the closed loop where it is scrubbed and returned to the filter vessel as cleaned media while dirty scrub water is discharged from the scrub vessel and leaves the system.

12 Claims, 3 Drawing Sheets

FILTER SYSTEM WITH EXTERNAL SCRUBBER

BACKGROUND OF THE INVENTION

My prior U.S. Pat. Nos. 4,496,464 and 4,966,698 disclose a filter system that has a filter media comprising particles of filter material contained within a vessel. Liquid flows through the filter media of the vessel, removing unwanted contaminants from the flowing liquid. The present invention is an improvement over the filter apparatus set forth in my previous U.S. Patents and the prior art cited therein, and to which reference is made for further background of this invention as well as mentioning the prior art.

The cited media of this invention includes pecan hulls, or a mixture of pecan hulls, walnut hulls, apricot pits, and many other useful media substances including sand as well as natural and synthetic media substances of various composition. The present invention sets forth a new filter system that utilizes these and other various filter media, wherein the filter media is scrubbed and cleaned externally of the main filtering vessel, thereby cleaning the media from time to time by removing a small portion of the media from the large portion of the media that remains within the vessel, and scrubbing the removed media clean, thereby rejuvenating it for reuse.

One of the major problems found in many of the filter systems of the above type that are in use today is the inability to maintain a uniform cross-sectional area of the media bed. The actual throughput area of a filter system has been found to be a function of the cross-sectional area that can be cleaned rather than the actual area of the filter vessel or filter bed. For example, in an original filter bed that used 78.5 square feet of area, the usable cross-section of the filter bed was found to be less than 50 square feet (8 foot diameter). This disparity between the theoretical and actual areas is directly related to the difficulty in maintaining turbulent flow adjacent to the vessel wall during backwash.

Applicant has found that when an area of the filter cannot be penetrated by the backwash flow, this area no longer functions satisfactorily for filtration and cannot be recovered by prolonged ineffectual backwash, and therefore it no longer functions as part of the filtering media.

Another problem with some above prior art filter arrangements lay in its operation as well as in its design. Starting and stopping flow through the filter causes the media to cyclicly decompress and then to recompress. This cyclic action of the media allows trapped particles within the filter media to be released when the flow through the filter media is resumed, thereby increasing the concentration of the contaminants contained within the filtered liquid. It has been found to be poor technique to allow shut down of the filters as a throughput control because this action is very detrimental to the efficiency of the deep bed filter. This shutdown allows bacteria to grow within the bed as well as causing the oil wetted particles to bind the media together. Hence, operating the filter at maximum throughput for a portion of the day, and off for the balance, reduces the quality of the filtered stream.

It is a common practice to attempt to alleviate some of these problems by using a surfactant to clean the filter bed, however this causes the resultant filter bed to become very slow in trapping particles following the backwash cycle. This causes the filter system to pass the particles through the filter bed for as much as 30 to 60 minutes after carrying out the backwash cycle, which further reduces the quality of the separated stream.

The present invention overcomes the foregoing drawbacks and achieves new and desirable results by the provision of an improved filter system along with a method of operation; and, further provides for such an improvement to be retrofitted to many existing prior art filter vessels to thereby advantageously allow the old system to be upgraded and unexpectedly improved, as will be better and more fully appreciated later on as this disclosure is more fully digested.

Throughout this disclosure, the term "contaminated water" and "dirty water" is intended to include any liquid having foreign particles admixed therein that must be separated from the liquid and discarded, or retained because of it value.

SUMMARY OF THE INVENTION

This invention comprehends a new filter system and method of operation therefor. The system includes a filter vessel within which a filter media is supported. The media includes various nut shells or hulls, such as walnut hulls or shells, and apricot pits, as well as other useful substances or a mixture thereof. Dirty liquid flows into the vessel and through the filter media in a particular manner in order for the filter media to remove the unwanted substances or contaminants from the liquid, and vice versa. The new filter system utilizes a filter media that is cleaned from time to time by carrying out a backwash cycle, wherein fluidizing and cleaning of the bed is accomplished by circulating the fluidized bed in a closed loop that includes a scrubing and separation vessel located externally of the filtering vessel.

More specifically, the filter media is rejuvenated during a backwash cycle wherein the filter media is fluidized by isolating the filter vessel and circulating the dirty liquid contained within the vessel in a manner to fluidize the media contained within the vessel. During this time a stream containing the contaminated, fludized, dirty media and water is removed from the filtering vessel and directed through a closed loop apparatus that includes a scrubber and separation vessel. The removed stream of fluidized media is cleaned and separated from the dirty liquid as it flows through the scrubbing and separation vessel. The separated media along with a small portion of the scrub water is replaced within the filter vessel as cleaned media, and the residual dirty scrub liquid flows to a scrub liquid holding tank for subsequent treatment or discarded. This scrubbing operation continues until all of the filter media has made sufficient trips through the closed loop apparatus to have been satisfactorily cleaned.

The invention preferably is carried out by substituting the novel closed loop apparatus of this invention for the corresponding prior art apparatus found on old filter systems of various types.

In one embodiment of this invention, a plurality of closed loop apparatus are connected in parallel respective to one another and connected to a filter vessel, with the closed loops being spaced from one another and, when actuated, jointly cooperate together to fluidize all of the filter media contained within the filter vessel, whereupon a proportionate quantity of the fluidized filter media is pumped through each of the closed loops, thus subjecting all of the filter media contained within the filter vessel to a cleaning and rejuvenation action.

Accordingly, a primary object of the present invention is the provision of method and apparatus for filtering contaminants from a stream of dirty liquid by flowing the dirty liquid through a filter system having a filter media, leaving the contaminants on the filter media, and subsequently cleaning the filter media from time to time when the media becomes loaded with the separated contaminants in order to rejuvenate and thereby avoid the cost of replacing the filter media.

Another object of this invention is to provide method and apparatus by which a contaminated stream of liquid is filtered during one interval of time to provide separation of contaminants from a contaminated liquid, and then scrubbing the filter media in a new and unobvious manner during another interval of time, with the filtering step and cleaning step each occurring within separate vessels.

A further object of this invention is to disclose and provide a method of filtering a stream of dirty liquid by flowing the dirty liquid into a filter vessel having a liquid space and a filter media space. The dirty liquid flows through the filter media thereby leaving the contaminant within the media, so that clean, filtered liquid exits the filter vessel. Thereafter, as the media becomes loaded with the contaminates, the vessel is isolated, fluidized, and circulated through a plurality of closed loop apparatus, each having a scrub vessel externally of the filter vessel, and a fluidizing nozzle within the filter vessel. As the fluidized media flows along the plurality of parallel streams provided by the closed loops, the media is scrubbed clean. The fluidized media makes multiple passes through the closed loops. The scrub and separating vessel of each of the closed loops is distinct from the filter vessel. The circulating media is scrubbed as it flows through the scrub vessel and is thereafter returned to the associate nozzle located within the filter vessel. This operation continues until all of the media has been cleaned sufficiently to restore the filter media to a rejuvenated condition, whereupon the filtering operation is resumed.

A still further object of this invention is to provide a new, useful, and unobvious filter system having particles of filter media contained within a filtering vessel which filters solids, hydrocarbons, and other unwanted material from a flowing liquid, and wherein the filter media occasionally is fluidized and translocated from the filter vessel into a scrub vessel where it is scrubbed clean of the filtered products. The removed products are then discharged from the system. The scrubbing and filtering action is carried out within different vessels. The filtering operation is resumed after the media has been scrubbed clean of the products.

Still another object of the present invention is the provision of a filter device having a filter media made mostly from crushed nut shells or hulls and supported by a filter screen wherein a dirty stream of liquid is cleaned as it travels through the media and screen, and wherein the filter media eventually becomes loaded with the removed substance and is therefore subsequently scrubbed and cleaned as it is circulated through a scrub vessel spaced from the filter vessel, and wherein the removed substance is transferred into the scrub water which exits the system leaving a rejuvenated filter media ready to resume the filtering operation.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

DETAILED DESCRIPTION OF THE PREFERRED EMBODIMENTS

In the figures of the drawings, and in particular FIGS. 1–3 and 10, there is disclosed a filter system 10 made in accordance with the present invention. The system 10, as seen in the figures of the drawing, include a relatively large filter vessel 12, that supports a relatively small scrub and separator vessel 14, hereinafter referred to herein as a scrub vessel. Dirty filter media and scrub water from the filter vessel 12 occasionally flows through the scrub vessel where it is cleaned and separated from the contaminants that have been removed from the water and deposited on the filter media. A scrub water holding tank 16 is arranged adjacent to filter vessel 12 and preferably is of equal or greater volume respective to the filter vessel 12.

Figure 11:
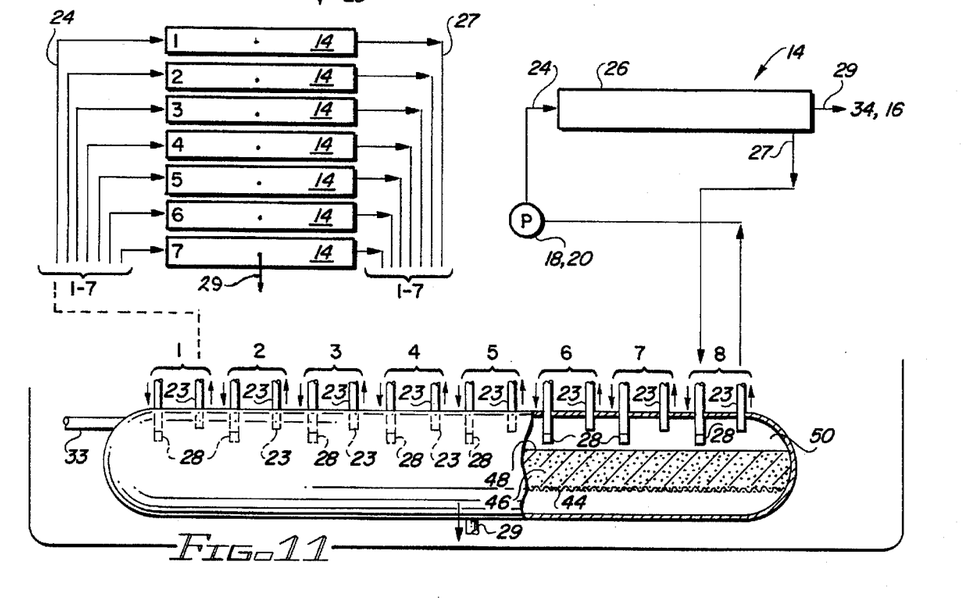

Dirty water inlet 17 provides a source of dirty water or dirty liquid to be filtered by the system in order to realize clean or treated water. A pump 18 is driven by a suitable motor 20 and, as seen in FIG. 11, has an inlet or suction 22 and an outlet or discharge 24 connected to fluidize the contents of the filtering vessel 12, and to scrub contaminants from the fluidized media as it flows in a closed loop between the scrub and filter vessels. The scrub vessel 14 has an outer shell 26 to which there is connected a separated media discharge 27 leading to a fluidizing nozzle 28, and a separated dirty water outlet 29 leading to the scrub water holding tank 16. The scrub vessel 14 separates dirt, debris, hydrocarbons, and other substances from the filter media in a manner that will be more fully described later on herein.

Figure 3:
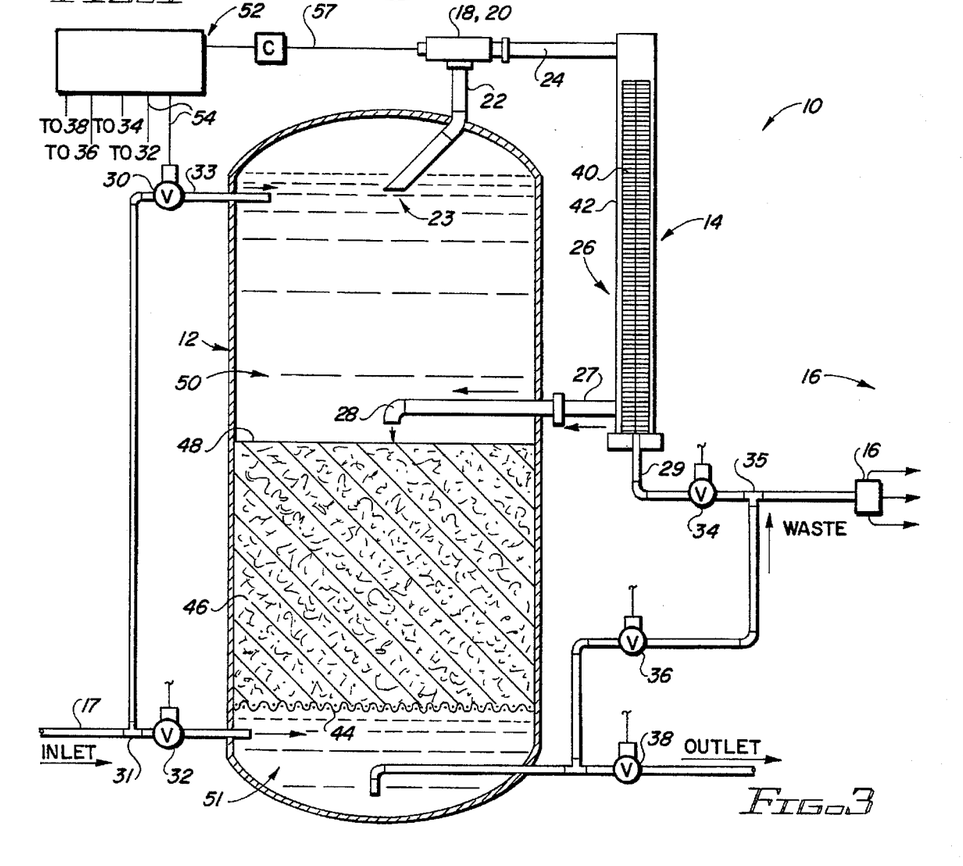
FIG. 3 is an enlarged, diagrammatical, side elevational view that set forth additional details of FIG. 2.

In FIG. 3, valves 30, 32, 34, 36, and 38 are arranged to control the flow of the fluid streams associated with the system 10. Assuming that the dirty liquid to be treated is ordinary sea water, and that the contaminant is the substances normally found suspended in sea water which, for one reason or another must be removed and discarded, it will be noted that the sea water enters the dirty water inlet 17 of the system at junction 31, where it is divided into the illustrated two parallel streams that are connected to valves 30 and 32, respectively, and which in turn are connected to the upper and lower interior spaces of the filtering vessel 12, as best seen illustrated in FIG. 11.

Valve 34 of FIG. 3 controls the flow of the separated liquid stream that is discharged from the scrub vessel 14 and flows on to junction 35, where the stream is divided into the illustrated two parallel streams that are connected to valve 36 and to the dirty scrub water storage vessel 16, respectively. The valve 36 is connected to control flow between junctions 35 and 37. Valve 38 is connected to control flow from junction 37 to the filtered liquid outlet, sometime referred to as a treated or clean water outlet or discharge.

Figure 10:
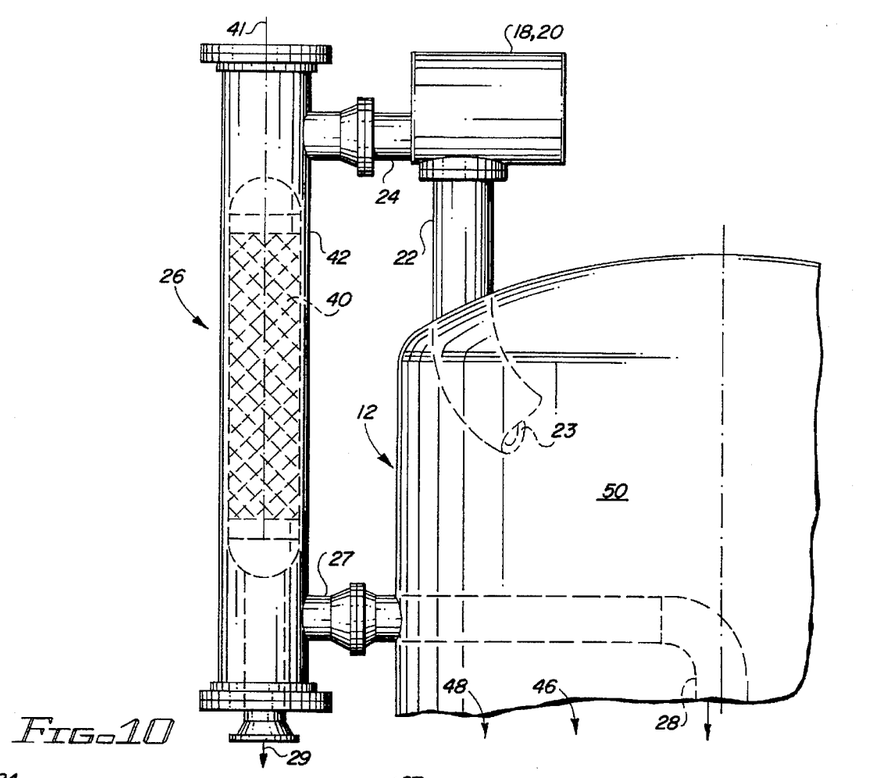
FIG. 10 is a schematical representation of the invention diagrammatically showing a modification of the filter apparatus disclosed in the foregoing Figures; and, FIG. 11 is a broken, detailed, side elevational view which discloses additional features of the closed loop apparatus of the invention and illustrates the closed loop in combination with a filter vessel.

The scrub vessel 14 of FIGS. 3 and 10 has a separator outlet screen 40 arranged along the longitudinal central axis 41 thereof, and forms an annulus 42 therewith along which fluidized media flows during the cleaning, scrubing, and separating step. The separator and scrub screen 40 is preferably of a cylindrical configuration, and having a closed upstream end thereof opposed to an open downstream end thereof. The downstream end forms the separated dirty water discharge 29. The screen 40 preferably has a multiplicity of small openings formed therein, similar to the openings in the filter screen 44 of the filter vessel 12, which preclude passage of the filter media particals therethrough and admits passage of the liquid bearing the scrubbed or removed contaminants to pass from the annulus 42, and into the interior of the cylindrical screen 40. The dirty scrub water exits axially of the downstream end of the screen as it is discharged from vessel 14. The discharged dirty scrub water continues along separated dirty water outlet 29, through the valve 34, while the cleaned media exits the annulus 42 and enters the discharge 27 to supply the nozzle 28 with fluidizing material during the cleaning and separation process, as the cleaned media, along with the residual liquid, is returned to the filter vessel.

The filtering screen 44 of FIGS. 3 and 10 has a peripheral edge thereof attached to the circumferentially extending sidewalls that form the vessel 12. The filtering screen 44 supports a filter bed 46 thereon. The top 48 of the bed 46 is located below and adjacent the fluidizing nozzle 28, leaving liquid space 50 in the upper end of the vessel 12. Nozzle 28 is arranged to fluidize the entire filter bed 46 during the cleaning process, leaving no quiescent zones therein.

A computerized control panel 52 of FIG. 3 provides intelligence and sends appropriate signals along electrical conduits 54 and 56 for actuating valves 30–38 and for controlling the action of pump motor 20 in a logical, predetermined, sequence as will be more fully appreciated after this disclosure has been more fully digested. A valve control device is suitably connected for appropriately actuating each of the valves 30–37. Numeral 56 illustrates the power input from the control panel to the valve 30, for example, while numeral 57 indicates a source of power for the pump motor 20, for example.

The outlet of the nozzle 28 of FIGS. 3 and 10 is shown spaced above and perpendicularly disposed respective to a fill-line 48 of the filter media 46; however, the outlet can be located at other elevations respective to the fill-line 46, if desired. Alternatively, depending on the geometrical configuration of the filter vessel, the nozzle can be arranged tangentially respective to the vessel side walls and directed towards an area adjacent the screen when deemed desirable to do so.

Provision can be made for momentarily connecting junction 35 to the inlet 31 for flushing the closed loop, and thereafter connected to an appropriate disposal facility 16 for disposing of dirty scrub water, except in those instances where the contaminant is valuable and it is desired to be retained for subsequent commercial exploitation. A float actuated valve means can be arranged to remove compressible fluid from the uppermost end of the filter vessel 12.

In FIGS. 1–4, the filter vessel 12 is shown in normal filtering operation with the settled filter media 46 shown supported within the vessel 12 with the screen 44 separating the media from the filtered liquid chamber 51, and with the filter media 46 separating the dirty liquid contained within the upper part 50 of the vessel from the screen 44.

Filtration and Clean-Up Sequence:

1. Filtration . . . 30 hours more or less
2. Fluidization . . . instantaneous
3. scrubbing . . . 10 minutes under normal conditions
4. Settling . . . less than 1 minute
5. Normalization . . . less than 1 minute Return to Step 1.

Figure 4:
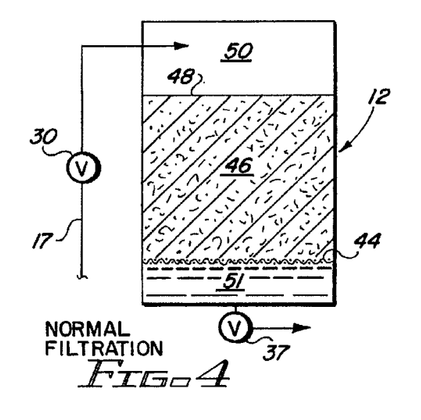
FIGS. 4–9 diagrammatical set forth the method of the present invention.

As seen in FIGS. 3 and 4, dirty water is pumped by any suitable means to provide the dirty water source 17, and then through inlet pipe at valve 30 near the top of vessel 12. The liquid flows down through the media bed, then out through the screen where solids are trapped and remain in the media bed, and the clean water exits down through the clean water outlet. The filtration mode preferably is controlled by a timer or pressure differential sensor which can be set to accommodate different types and severity of liquid contaminants. If the liquid is much more contaminated than the usual well water, the filtration sequence will have to be of much shorter duration, and the media bed rejuvenated more often. If the water contains low amounts of solids, the filtration time can be extended because rejuvenation and discharge will not be needed quite as often.

Figure 5A:
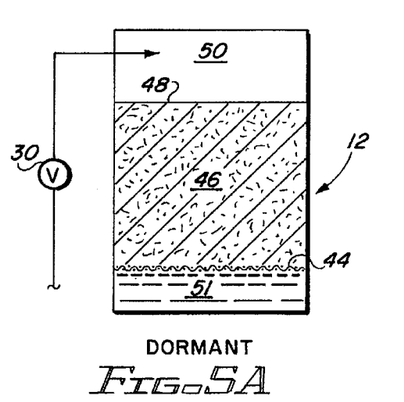

When the time has elapsed for the filtration mode, or when the pressure drop across bed has unduly increased, the outlet valve 38 for clean water (see FIG. 3) will shut off and no more dirty water will enter the vessel through feed pipe 17. The system is now isolated as seen in FIG. 5A. Then valve 32 is opened while valve 30 is closed (see FIG. 3), thus placing the filter system into the configuration of FIG. 5B, whereupon dirty makeup water is supplied within chamber 51.

Figure 6:
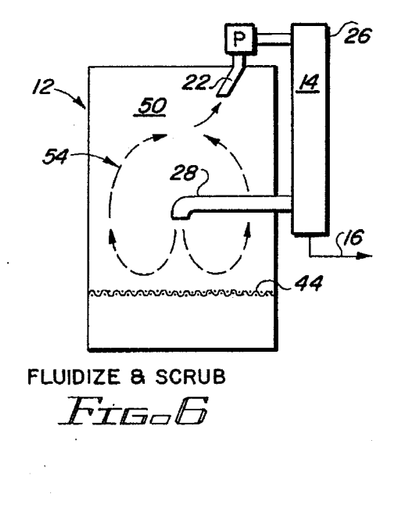
Figure 7:
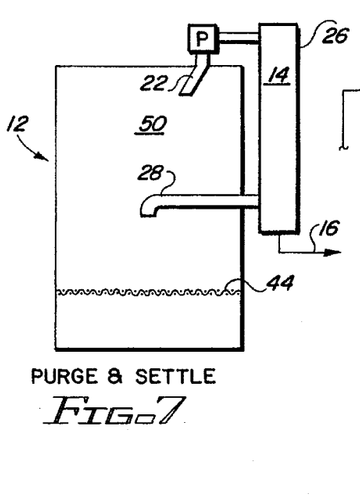

Next, as seen in FIG. 6, the scrub and fluidization pump 18 will turn on and begin pulling the water and media up through the top of the filter vessel by the pump suction at 23. Simultaneously the fluidization commences due to the action of the fluidizing nozzle 28. The water and filter media flows up through the intake 22, through the pump 18, outlet pipe 24 and through annulus 40 of scrub vessel 14 where the separation and cleaning takes place. The scrubbed media returned at 27 to nozzle 28 and flows back out into the vessel as seen illustrated in FIGS. 3 and 6, for example. By flowing the water through the closed loop in this described manner it exits the nozzle 28 where it is directed through the middle of the filter vessel, onto the center of the screen, and flows thereacross and thereafter impinges against the sides of the filter vessel 12. Then it flows back up to the pump intake 23, as shown in FIG. 7. Thus the flow forms a toroidal flow path. The fluidization mode is carried out during the entire cleaning process, and as time passes, the filter media becomes progressively cleaner each pass of the media through the scrub vessel.

In FIG. 6, once the bed has been fluidized, the discharge outlet valve 34 (see FIG. 3) will remain opened and pump motor 20 will remain turned on to continuously fluidize and scrub the bed as it passes through the scrub vessel 14. The cylindrical scrub and separation screen 40 leading to the scrub vessel outlet 29 will clean the dirty media with scrub water and remove the contaminants from the media. The scrubbed media exits the annulus 42 and continues to flow on to the nozzle 28.

The scrub and separator screen acts as a separator as the media, along with sufficient water to maintain fluidization, is cleaned and returned to the nozzle. The scrub screen will hold back the media, but the unwanted solids, dirt, and other contaminants will be washed through the screen openings, into the dirty scrub water central passage connected at 29, through valve 34 where the water is discharged at junction 35 to the scrub water holding vessel 16, as seen in FIG. 7. Discharge time may be as little as ten minutes under normal sea water filtering conditions.

It is preferred that the scrubber 14 have a capacity that measures about 5% of the volume of the dirty liquid to be scrubbed, and that the scrub and separator part of the system have a flow rate that passes the entire volume of the dirty liquid therethrough in less than one minute, whereby any selected quantity of the filter media will make at least 10 trips through the cleaning and separating vessel during a ten minute cleaning cycle, for example only.

In FIGS. 3 and 7, once the cleaning step of FIG. 6 is completed, the system enters the purge and settle mode by closing valve 32 while valve 30 is opened and the system is purged by discharging the residual dirty scrub water into the scrub water holding vessel 16.

Figure 8:
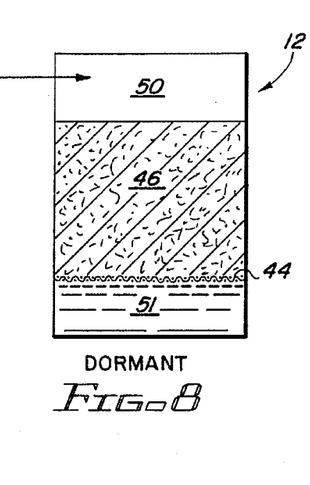

Next, as seen in FIG. 8, the outlet discharge valve 34 will close and the fluidization pump motor 20 will turn off. This allows the media to gravitate back onto the filter screen 44 to form a rejuvenated bed as seen in FIG. 8. In FIG. 8, following the scrubbing step of FIG. 6 and the purge and settle step of FIG. 7, the system is allowed to settle for 30 seconds, and then the backwash pump is again run for 2 seconds to purge the closed loop. The unit is then allowed to settle for another 30 seconds as seen illustrated in FIG. 8.

Figure 9:
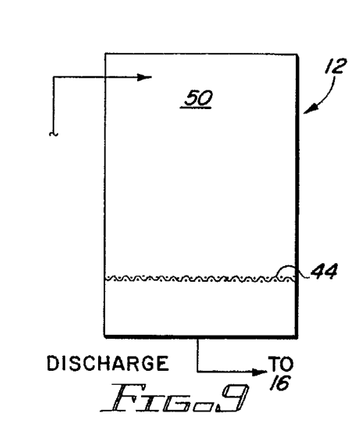

In FIG. 9, once the bed has settled, the filter control 52 of FIG. 3 changes the system configuration into a pre-filter or normalizing step. This is achieved by opening the outlet discharge valve 36 (see FIG. 3) in order that the dirty water and solids can flow out through the discharge valve and to the scrub water holding tank 16, thereby preparing the bed for another filtration cycle. At the end of this normalization step, valve 38 will open, valve 36 will close, allowing filtered water to be transported to wherever it is needed once the filtration resumes, as seen in FIGS. 3 and 4.

The control panel 52 of FIG. 3 can be a computer which is programmed to switch the variables of the system to achieve various modes of operation in accordance with the desired program selected for a specific filter operation. On the other hand, the control panel 52 can be equipped with a cam timer which will control the above filtration sequence. In any event, the timer will control the opening and closing of the various controlled process steps and, the pump will be turned off and on by the panel.

The discharge from valve 36 can be used for discharging into flow line at 35 so that after the scrubbing, discharge, and settling steps the normalization step can be carried out by flowing through the vessel, into the scrub water vessel 16, thereby cleaning contaminants from the filter vessel prior to discharging water into the filtered water outlet downstream of valve 38.

Further, oil and other light ends are separated from the inlet liquid and are withdrawn through the vent, rather than removed by the bed, thereby avoiding contamination of the bed with oil and greatly extending the filtering cycle. The separation occurs because the oil tends to rise towards the top of the filter vessel, where it is then entrained by any upwardly flowing liquid which is discharged through the vent.

Figure 1:
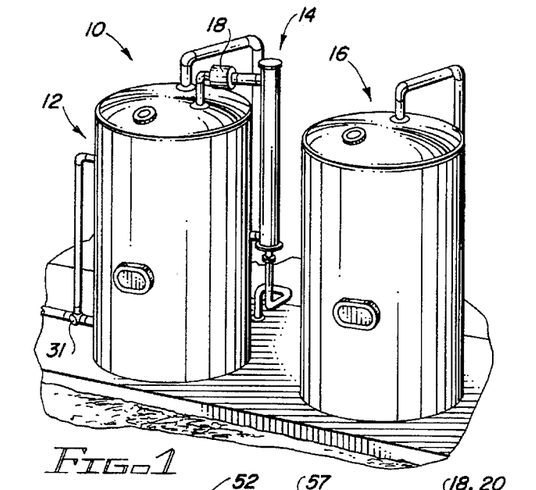
FIG. 1 is a part diagrammatical, part schematical, side elevational view of a filter system made in accordance with the present invention.
Figure 2:
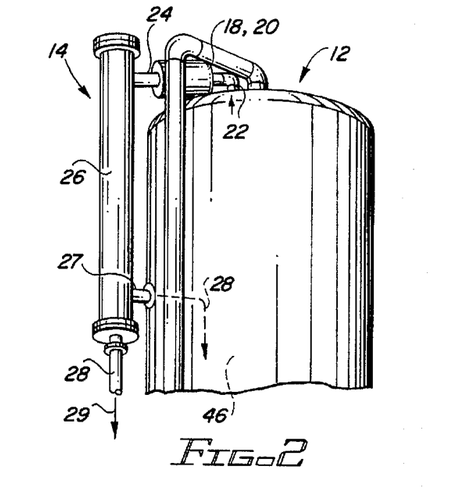
FIG. 2 is an enlarged, side elevational view of part of FIG. 1.

FIG. 11 shows the details of another embodiment of a filter system having a relatively large filter vessel 112 that supports a plurality of relatively small scrub and separator vessels 14, each of which are substantially the same as previously illustrated in FIGS. 1–3. Dirty water at inlet 33 enters filter vessel 112 where the contaminants are separated therefrom to provide clean or treated water at outlet 29. Hence the filter vessel 112 filters liquid in the same manner previously explained in conjunction with FIGS. 1–10.

Each of the scrub and cleaning closed loop flow paths include the pump 18 driven by a suitable motor 20, an inlet or suction 23 for receiving fluidized media from filter vessel 112, and an outlet or discharge 24 connected to the appropriate scrub and filter vessel 14. Fluidized dirty filter media and scrub water received from the filter vessel 112 occasionally flows in parallel through the plurality of scrub vessels 14 where it is cleaned and separated from the contaminants that have previously been deposited on the filter media during the filtering operation. A scrub water holding tank (16 of FIGS. 2 and 3) is arranged adjacent filter vessel 112 and preferably is of equal or greater volume respective to the filter vessel 112.

When the filter media becomes loaded with removed debris, the closed loops jointly become operational to fluidize the contents of the filtering vessel 12, to scrub contaminants from the fluidized media as the media flows in a closed loop between the scrub and filter vessels, to separate the contaminants from the media, and return rejuvenated media to the filter vessel where the filter cycle is resumed. This cleaning cycle is operated in the same manner as the previous embodiment of the invention, except for the plurality of closed loop apparatus.

In FIG. 11, one closed loop is shown in detail at numeral 8 while closed loops 1–7 are diagrammatically indicated by the numerals 1–7. It should be understood that all loops 1–8 are identical and made in accordance with the first embodiment of the invention.

To be redundant, the scrub vessel 14 of the loops 1–7 has an outer shell 26 to which there is connected a separated media discharge 27 leading to a fluidizing nozzle 28 arranged within the filter vessel. A separated scrub water outlet 29 leads from vessel 14 to a scrub water holding tank 16 (FIGS. 1 and 3). Each of the scrub vessels 14 are operated simultaneously to separate dirt, debris, hydrocarbons, and other substances from the fluidized filter media.

The unexpected results obtained with the embodiment of FIG. 11 is the unusually large volume throughput capacity that can be achieved, the small space requirements of the entire system, the lowered cost of operation, and the simplified engineering and manufacturing of the equipment. These are the desired attributes of filter systems used on off-shore platforms where space may cost $10,000/sq.ft., for example.

For example, a 12 foot diameter filter vessel 40 feet in length having 4 closed loop scrubbing apparatus associated therewith can be made to supply 10 million gallons/day filtered water, which is several times greater than any known prior art filter system can accomplish. Moreover, the entire 40 ft long 12 ft diameter vessel along with its appropriate controller (52 of FIG. 3, for example) can be loaded on a flat bed truck and transported to any desired area, as for example flood areas needing clean drinking water. The unit arrives ready to be connected to a dirty water supply, a filtered water supply, and a scrub water discharge.

It is noted that the vessel 112 can be of various lengths and diameters to accommodate any desired load, with a plurality of identical closed loop systems being employed as considered necessary for achieving proper fluidization and scrubbing.

This invention is to both method and apparatus for filtering solids, liquid hydrocarbons, and other contaminants from a stream of fluid such as water. During the filtering operation, contaminated liquid flows into the filter vessel, through the media, through the screen means that supports the media, and away from the vessel, while the contaminants are deposited on the media. From time to time, as the media becomes impervious due to the deposition of the contaminants accumulated thereon, the media must either be replaced or rejuvenated in a manner to improve its porosity so that the pressure drop across the vessel is returned to a satisfactory value. This is achieved by periodically subjecting the dirty media to a scrubbing operation wherein it is cleaned or rejuvenated whenever the accumulated contaminants have reached a magnitude which increases the pressure drop across the filter vessel to an unacceptable and predetermined value.

Figure 5B:
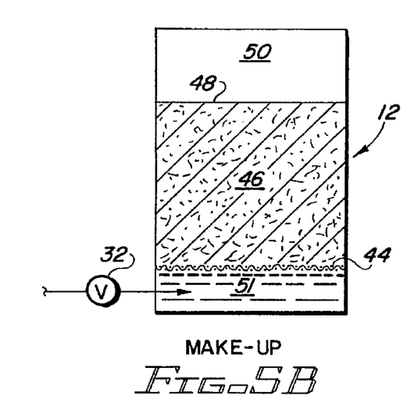

In operation, assuming dirty or contaminated water from which solids, liquid hydrocarbons, and other contaminants is to be separated to provide clean water, the dirty water is cleaned during the filtration cycle by passing it through the filter media. As the dirty water travels from top of the vessel to the bottom thereof, the solids and other particles are trapped on the surface of the individual particles of the filter media during the filtering process. Eventually the pores of the bed become blocked with the separated material and the differential pressure across the bed will increase in proportion to the quantity of the separated material deposited within the bed. When the differential pressure exceeds a predetermined value, 14 psi, for example, the filter system is arranged to clean the filter bed, according to the method of the invention which is carried out as follows:

Following the normal filtration step of FIG. 4, the system enters the dormant stage of the backwash cycle seen in FIG. 5A by shutting off the outlet valve which normally discharges clean filtered liquid from the lower end of the filter vessel, whereupon the flow from within the filter vessel ceases within a first time delay of about 1 second. Next, as seen in FIG. 5B, valve 32 opens while valve 30 closes which provides unfiltered makeup water at the bottom of the filter vessel.

Next, the media pump motor 20 is energized to start the scrubbing action for a second time delay interval during which the media pump fluidizes the relative large quantity of filter media while circulating a relatively small quantity of the media in a closed loop scrubbing apparatus which includes the upper end of the vessel which contains the filter bed, flow conduits connected externally of the filter vessel, though the scrubber/separator of the invention, and back into the filter vessel by means of the fluidizing nozzle. During this second time interval essentially all of the filter media is fluidized, with most of the fluidized bed being contained within the filter vessel and a small part thereof flowing through the closed loop.

In FIG. 7, at the expiration of the second time interval of less than 12 seconds, the backwash valve 34 opens, allowing the dirt and oil that has been separated from the bed to commence discharging into the scrub water holding tank for subsequent treatment, after which the backwash valve closes.

In FIG. 8, following the scrubbing step, the system is allowed to settle for 30 seconds, and then the backwash pump is again run for 2 seconds to purge the closed loop. The unit is then allowed to settle for another 30 seconds.

Next, as seen in FIG. 9, the bypass valve 36 opens allowing the filter to begin filtering, but concurrently diverting the circulating water through valve 36 to the scrub water holding tank, with unfiltered water replacing the discharged liquid. After a few minutes of operation, the filter outlet valve 38 opens and the bypass valve 36 closes to resume operation of the long filter cycle of FIG. 4 which follows each cleaning cycle and which can last several hours or days depending on the throughput and degree of contamination in the dirty liquid.

In FIG. 11 the modification 110 of the filter system 10 of FIGS. 1–3 carries out the backwash operation in a plurality of spaced, closed loop scrubbing and separating apparatus 114. The closed loop apparatus are connected in parallel and to a common filter vessel, with each of the closed loops being spaced from one another and arranged in side by side relationship according the FIG. 10. When actuated, the closed loop apparatus jointly cooperate together to fluidize all of the filter media in the filter vessel.

In FIG. 11, the fluidizing nozzles are arranged tangentially respective to the sidewall of the common filter vessel 112. The scrub water discharge from the plurality of scrub vessels 114 can be connected to a common scrub water tank 116 or otherwise discharged from the system as may be desired.

This invention can be practiced by substituting the plurality of the novel closed loop apparatus for the corresponding prior art apparatus found on old filter systems of various types.

This invention results in the following unexpected and desirable advantages heretofore unavailable with present systems:

The new filter system cleans the media as individual particles, and not as a bed, and thereby avoids the formation of dead spots after backwash, and provides a bed more like a new one after each backwash.

The design of the system enables all available filters of a multifilter unit operation to be in use simultaneously. Each filter system can be throttled for station control. Shut-down occurs only in the event of lack of supply of water or a full run product tank.

Surfactants are eliminated because the filter establishes good water quality in approximately one minute after backwash, which is diverted to a backwash holding tank. The water quality far exceeds that of present known filter units of similar design.

I claim:

1. A filter system for removing products from dirty liquid flowing therethrough and thereby providing a filtered liquid, comprising:

a filter vessel having an inlet for providing a dirty liquid flow into one end thereof and a clean liquid outlet through which filtered liquid can exit said filter vessel; a filter screen supported adjacent said clean liquid outlet and within said filter vessel through which filtered liquid must flow in order to exit said outlet; a quantity of particulate filter media in said filter vessel received against said filter screen for normal filter operation wherein products are captured by said particulate filter media and filtered as liquid flows through the media and the filter screen and then exits through said clean liquid outlet;

a closed loop flow path comprising an intermittently operable scrub vessel connected exteriorly of said filter vessel, a fluidizing nozzle, and pump means;

said scrub vessel having a fluidized media inlet, a cleaned media outlet, and a scrub water discharge; said cleaned media outlet being connected to said nozzle for discharging the cleaned media towards said filter screen and thereby fluidizing the media and liquid contained upstream of said filter screen; said pump means having a suction inlet in said filter vessel above said filter screen for receiving flow of dirty liquid from the interior of said filter vessel, and a pump outlet connected to said scrub vessel;

a scrub and separator screen in said scrub vessel through which liquid and removed contaminants can flow while the filter media is substantially precluded from flowing through the scrub and separator screen; a scrub water discharge chamber formed contiguous respective to said scrub water screen and connected to discharge contaminants and liquid from said discharge chamber through said scrub water discharge;

said nozzle being aligned within said filter vessel such that said particulate filter media and any liquid contained upstream of the screen assumes a flow path which fluidizes the particulate filter media to facilitate flow of the fluidized media from the filter vessel into the scrub vessel where a scrubbing action translocates any removed products from the particulate filter media into the dirty liquid and a part of the dirty liquid is separated from the cleaned media and discharged from the scrub water discharge;

whereby, a relative large quantity of the fluidized media can be fluidized within said filtering vessel to thereby suspend the particulate filter media and the products within the dirty liquid while said fluidized media is directed through said pump means and into said scrub vessel where contaminants are scrubbed from said particulate filter media as scrub water and contaminants flow through said scrub and separator screen, into said discharge chamber, and discharged from said scrub vessel by means of said scrub water discharge; and the scrubbed media continues through said scrub vessel and is returned to the filter vessel while contaminants and scrub water flow through said scrub water discharge, and said pump means circulates a relatively small quantity of the fluidized media through the scrub vessel where the media is cleaned and separated from the scrub water which is discharged from the system.

2. The filter system of claim 1, in which said filter vessel has a central axis, and, said scrub and separator screen has a central axis that lays along a longitudinal central axis of said scrub vessel and separates said scrub vessel into an axial passageway through which the media flows as it is being scrubbed and an annular passageway through which the removed contaminants and separated scrub water flows, and said nozzle is arranged along the filter vessel central axis to direct the fluidized media in a torodial flow pattern.

3. The filter system of claim 1 in which said scrub vessel has a central longitudinal axis, a scrub and separator screen axially aligned within said scrub vessel to form an annulus therebetween; and flow conduits arranged whereby the fluidized media flows into said annulus where the dirty liquid flows through the scrub and separator screen leaving the cleaned filter media in the annulus where it is discharged back through said nozzle thereby fluidizing the filter media contained within said filter vessel.

4. The filter system of claim 1 in which there are a plurality of said closed loop flow paths connected to said filter vessel with the nozzles of each closed loop being spaced from one another and arranged to jointly fluidize the entire media of said filter vessel.

5. A filter system for removing contaminants from a liquid flowing through the system comprising a filter vessel having an inlet into which a contaminated liquid flows and an outlet through which filtered liquid exits said vessel;

a filter screen supported adjacent said filter vessel outlet and within said vessel; a relatively large quantity of particulate filter media in said vessel and supported against said filter screen for normal filter operation wherein contaminants are captured by said particulate filter media and filtered liquid exits through said filter screen and said outlet;

a closed loop flow circuit for scrubbing the media having a nozzle in said filter vessel directed toward said filter screen, an intermittently operable scrubber apparatus supported exteriorly of said filter vessel having a fluidized media inlet, a cleaned media outlet, and a scrub water discharge, and further including a pump means in said closed loop having a suction inlet in said filter vessel for receiving flow of liquid from the interior of said vessel;

said nozzle being aligned with said filter screen in a manner such that the media is fluidized when the pump means provides a flow therethrough; a scrubing and cleaning screen in said scrubber apparatus through which liquid and removed contaminants can flow while filter media is substantially precluded from flowing therethrough, a scrub water discharge chamber formed contiguous to said scrub screen and connected to discharge contaminants and liquid from said discharge chamber through said scrub water discharge;

the flow of fluidized media into said scrubber apparatus is separated into a cleaned fluidized media and a dirty water stream and said dirty water stream is discharged therefrom while the cleaned fluidized media is returned to the filter vessel;

whereby, liquid containing contaminants scrubbed from said particulate filter media can flow through said pump, through said scrub and cleaning screen, into said discharge chamber, and from said scrubber apparatus by means of said scrub water discharge.

6. The filter system of claim 5 in which there are a plurality of said closed loop flow paths connected to said filter vessel with the nozzles of each closed loop being spaced from one another and arranged to jointly fluidize the entire media of said filter vessel.

7. A method by which contaminants are removed from a liquid flowing through a filter vessel having an inlet for providing a contaminated liquid flow into one end thereof and an outlet through which filtered liquid can exit said vessel, according to the following steps;

supporting a filter screen adjacent said filter vessel outlet and within said filter vessel and supporting a relatively large quantity of particulate filter media in said filter vessel and on said filter screen for normal filter operation; and, capturing contaminants in said particulate filter media by flowing contaminated liquid through said inlet while filtered liquid exits through said filter screen and said outlet;

forming a closed loop flow circuit for fluidizing said media and cleaning said media externally of said filter vessel by flowing contaminated liquid from said one end and along a closed loop flow path that includes a nozzle in said filter vessel and a scrubber vessel externally of said filter vessel;

mounting said nozzle respective to the media on said filter screen to fluidize the media while concurrently flowing the fluidized media along said closed loop;

forming a fluidized media inlet, a cleaned media outlet, and a scrub water discharge for said scrubber vessel, supporting a scrub and separator screen in said scrubber vessel through which removed contaminants can flow while the filter media is substantially precluded from flowing through the scrub and separator screen; forming said scrub water discharge chamber contiguous respective to said scrub water screen and connected to discharge contaminants and liquid from said discharge chamber through said scrub water discharge;

flowing fluidized media along said closed loop circuit by a pump means having a suction inlet in said vessel for receiving flow of liquid from the interior of said vessel;

and directing said nozzle in said vessel toward said screen means, aligning said nozzle such that said particulate filter media fluidized in the liquid assumes a flow path which scrubs the particulate filter media and translocates removed contaminants from the particulate filter media into the liquid;

whereby, liquid containing contaminants scrubbed from said particulate filter media is separated therefrom as the fluidized media flows through said scrubber vessel, with the last said liquid flowing into said discharge chamber, and away from said scrub vessel while the media is returned to the nozzle in the filter vessel.

8. The method of claim 7 wherein said filter screen is provided with a central axis that lays along a longitudinal central axis of said filter vessel and, arranging said separator screen and said scrubber vessel along a common longitudinal axis with the separator screen separating the cleaned fluidized media from the scrub water discharge.

9. The method of claim 7 and further including the steps of flowing the fluidized media along a plurality of parallel paths, each of which include one said closed loop flow paths that are connected to said filter vessel; and, spacing the nozzles of each closed loop from one another, and arranging the nozzles to jointly fluidize the entire media of said filter vessel.

10. A filter apparatus by which contaminants are removed from a liquid flowing therethrough, comprising:

a vessel having an inlet for providing a contaminated liquid flow into one end thereof and an outlet through which filtered liquid can exit said vessel;

a screen means supported upstream of said outlet and within said vessel; a quantity of particulate filter media in said vessel and supported by said screen for normal filter operation wherein contaminants are captured by said particulate filter media and filtered liquid exits through said screen means and said outlet;

a scrubber apparatus connected exteriorly of said vessel and including pipe means connecting the interior of said scrubber to the interior of said vessel by which said particulate filter media can be fluidized and the fluidized media circulated between said vessel and said scrubber apparatus;

said scrubber apparatus including: a housing having a scrubber inlet and an outlet, a scrub screen means mounted within said housing through which liquid and removed contaminants can flow while the filter media is substantially precluded from flowing therethrough, a pump means for moving contaminated liquid from the interior of said vessel to transfer fluidized media to the scrubber inlet; a nozzle in said vessel directed toward said scrub screen means, said nozzle being aligned in a manner such that said particulate filter media fluidized in said liquid assumes a flow path which scrubs the particulate filter media and translocates removed contaminants from the particulate filter media into the liquid; and discharge means for removing liquid containing contaminants scrubbed from said particulate filter media from said housing by flowing the liquid containing contaminants through said screen means and said discharge means.

11. The filter apparatus of claim 10, in which said housing has a longitudinal axis and said scrub screen has a central axis that lays along the longitudinal central axis of said housing, thereby providing an axial flow path separated from an annular flow path by said scrub screen, said annular plow path being said discharge means.

12. The filter apparatus of claim 11 in which there are a plurality of said closed loop flow paths connected to said filter vessel with the nozzles of each closed loop being spaced from one another and arranged to jointly fluidize the entire media of said filter vessel.

* * * * *